United States Patent [19]

Curtin

[11] Patent Number: 4,587,380
[45] Date of Patent: May 6, 1986

[54] INTERFACE FOR CONNECTING STANDARD TELEPHONES TO PARTY LINES

[75] Inventor: Leonard E. Curtin, Houston, Tex.

[73] Assignee: Harris Corporation, Melbourne, Fla.

[21] Appl. No.: 620,737

[22] Filed: Jun. 14, 1984

[51] Int. Cl.[4] .......................... H04M 1/70; H04M 3/16
[52] U.S. Cl. ................................. 179/17 A; 179/17 B; 179/17 E
[58] Field of Search ............. 179/17 E, 18 HB, 27 E, 179/28, 51 AA, 84 SS, 84 T, 86, 84 R, 84 A, 17 A, 17 B

[56] References Cited

U.S. PATENT DOCUMENTS

| | | |
|---|---|---|
| 3,626,106 | 12/1971 | Greening et al. ............. 179/18 AD |
| 3,689,705 | 9/1972 | Pinede et al. ....................... 179/17 E |
| 4,048,448 | 9/1977 | Canniff et al. ...................... 179/17 E |
| 4,221,935 | 9/1980 | Barsellotti et al. ................. 179/17 E |
| 4,224,476 | 9/1980 | Tuhy, Jr. ............................ 179/17 E |
| 4,293,737 | 10/1981 | Cepelinski .......................... 179/17 E |
| 4,406,004 | 9/1983 | Hall et al. ............................... 370/15 |
| 4,528,424 | 7/1985 | Middleton et al. ................ 179/17 A |

*Primary Examiner*—Stafford D. Schreyer
*Attorney, Agent, or Firm*—Antonelli, Terry & Wands

[57] ABSTRACT

A party line interface for permitting the connection of a standard telephone to a telephone central office which rings selected subscribers by applying a DC ringing potential of a selected polarity to a selected one of the tip and ring lines of the party line and a ringing tone is disclosed. The interface includes a signal path having two lines with each line having an input terminal and an output terminal. The input terminals are respectively adapted to be connected to the ring and tip lines of the party line. A programmable switching means is coupled to the signal path for selectively applying the ringing signal received by the party line interface to the output terminals for application to the ringing mechanism within the standard telephone as a function of the polarity of the DC component and ground reference applied to the input terminals by the telephone company central office. The ringing signal is applied to the standard telephone by the interface only when a chosen one of the two possible DC polarities provided by the party line central office is applied to a chosen one of the pair of lines of the signal path.

5 Claims, 2 Drawing Figures

INTERFACE FOR CONNECTING STANDARD TELEPHONES TO PARTY LINES

BACKGROUND OF THE INVENTION

1. Field of the Invention

The invention relates to circuits which permit the connection of a telephone designed for non-party line use to a party line which selectively rings subscribers by the transmission from the telephone company central office of a ringing signal having a direct current component of either a positive or negative polarity referenced with respect to ground and a time varying signal for activating the telephone ringing mechanism.

2. Description of the Prior Art

FIG. 1 illustrates a prior art party line system of the type in which a telephone company central office 10 applies a DC component of a particular polarity referenced to ground to either the tip line 12 or ring line 14 of party line 16 and a ringing tone of conventional frequency, such as 20 Hz. The ringing signal is received by each of the subscribers to the party line 16 which are identified by the legends PTY 1 and PTY 2. Each subscriber location is provided with a gas discharge tube 18 having a pair of diodes having anode and cathode electrodes. The diodes are ionized into conduction upon the application of a potential of a magnitude above the breakdown potential of the tube. The gas discharge tube 18 associated with each subscriber is connected to the tip 12 and ring 14 lines such that the tube will break down only in response to the application of a DC potential of the correct polarity to either the tip or ring line to which the appropriately polled anode or cathode of the tube is connected. Breakdown does not occur with any other combination of DC polarity applied to the tip 12 or ring 14 line to which the tube is connected. When a negative DC potential above the breakdown potential of the gas discharge tube 18 is applied to the ring line 14, current flows from ground to ringing circuit 22 at subscriber location 20 consisting of a first inductor 24 in parallel with a series combination of a second inductor 26 and capacitor 28 through the ionized gas contained in the tube to the ring line 14 which causes the ringing circuit to produce ringing tone. The negative DC potential applied to the ring line 14 will not cause the gas discharge tube 18 associated with the subscriber location 30 to conduct for the reason that a negative potential is of the wrong polarity to break down the diode which is connected to the ring line. If a negative potential is applied to the tip line 12, current flows from ground through the ringing mechanism 32 at subscriber location 30 consisting of the parallel combination of inductor 34 and a series combination of inductor 36 and capacitor 38 through the ionized diode to the tip line 12 to cause ringing at the second subscriber location to occur. FIG. 1 does not illustrate the connection of third and fourth subscriber locations to the tip line 12 and ring line 14, but it should be understood that the third and fourth subscriber locations are connected in a manner analogous to the first location 20 and the second location 30, except that the third subscriber location has the electrode connections reversed from those illustrated at the first subscriber location 20 and the fourth subscriber location has the electrode connections reversed from those illustrated at subscriber location 30.

Other party line ringing systems which use DC signals of selected polarity to ring subscribers are disclosed in U.S. Pat. Nos. 582,107, 2,249,154, 2,532,125, 2,666,812, 2,875,281, 2,886,809 and 3,662,116. The systems disclosed in the aforementioned patents are not programmable to choose the combination of the polarity of the DC component and the line to which the DC component must be applied to activate the subscriber ringing mechanism.

Party line service of the type described in conjunction with FIG. 1 and in the aforementioned patents must have each subscriber's telephone location provided with a circuit which accepts only one combination of DC polarity applied to one of the ring or tip lines of the party line and a special telephone having a ground line for completing the ringing circuit current flow path between the party line central office and the subscriber's location. These prior art party line systems will not operate with a standard non-party line two-wire balanced telephone because of the absence of a ground line.

SUMMARY OF THE INVENTION

An interface for a party line in accordance with the present invention permits each subscriber to purchase a standard telephone for connection to a party line which selectively rings subscribers by a DC component of a chosen polarity applied to either the tip or ring lines of the party line and a time varying signal. As used herein, standard telephone means a telephone designed for connection to a balanced line servicing one subscriber which is rung by a ringing signal of a standard frequency such as 20 Hz. The interface includes programmable switching means which selectively passes a ringing signal having a DC component of a single polarity and a time varying signal when appied to one of the two wires in a signal path for conducting audible frequency signals between the party line and a subscriber's standard telephone. The interface provides a ground reference for the other wire of the subscriber's standard telephone to activate the ringing mechanism by current flow through the wire carrying the DC component to the ground reference. The programmability of the interface to choose the polarity of the DC component on either the ring or tip line for causing the activation of the ringing mechanism permits a subscriber to purchase a standard telephone and program the interface to ring in response to the polarity provided for ringing by the telephone company central office to that subscriber's telephone.

A party line interface in accordance with the invention that includes a signal path for conducting audible frequency signals which has two lines with each line having an input terminal and an output terminal, the input terminals being respectively adapted to be connected to different lines of the pair of lines of the party line and the output terminals being respectedly adapted to be connected to different balanced wires of a standard telephone; and programmable switching means coupled to the signal path which is adapted to be coupled to ground for selectively applying the ringing signal received by the party line interface from the central telephone office to the output terminals for application to a ringing mechanism within the standard telephone as a function of the polarity of the DC component and ground reference applied to the input terminals, the ringing signal being applied to the standard telephone by the interface only when one of the two polarities provided by the telephone company central office is applied to one of the pair lines of the signal path.

The programmable switching means may comprise first programmable switching means having a pair of inputs which are respectively adapted to be coupled to separate ones of the pair of lines of the party line and a pair of outputs coupled respectively to separate ones of the lines of the signal path for permitting selective connection of each line of the pair of lines of the party line system to a desired one of said lines of the signal path; a second programmable switching means having a first input which is respectively adapted to be coupled to the pair of lines of the party line and a second input adapted to be coupled to ground and one of the pair of outputs of the first programmable switching means and a pair of outputs; first switching means coupled in series with one of the lines of the signal path which is selectively openable upon application of a control signal, the one of the lines of the signal path being coupled in series with the first switching means having a part which is coupled to one of the wires of the standard telephone; means for generating a control signal when the time varying signal is present, the means for generating a control signal being coupled to the outputs of the first programmable switching means; and second switching means having a terminal adapted to be coupled to ground for establishing a connection between said terminal of the second switching means and the part of the one of the lines of the signal path when the second switching means is closed, the second switching means having a pair of inputs coupled to the outputs of the second programmable switching means, the second switching means being closed only upon the presence of predetermined signal polarities at the inputs of the second switching means.

DESCRIPTION OF THE PREFERRED EMBODIMENT

Figure 1:
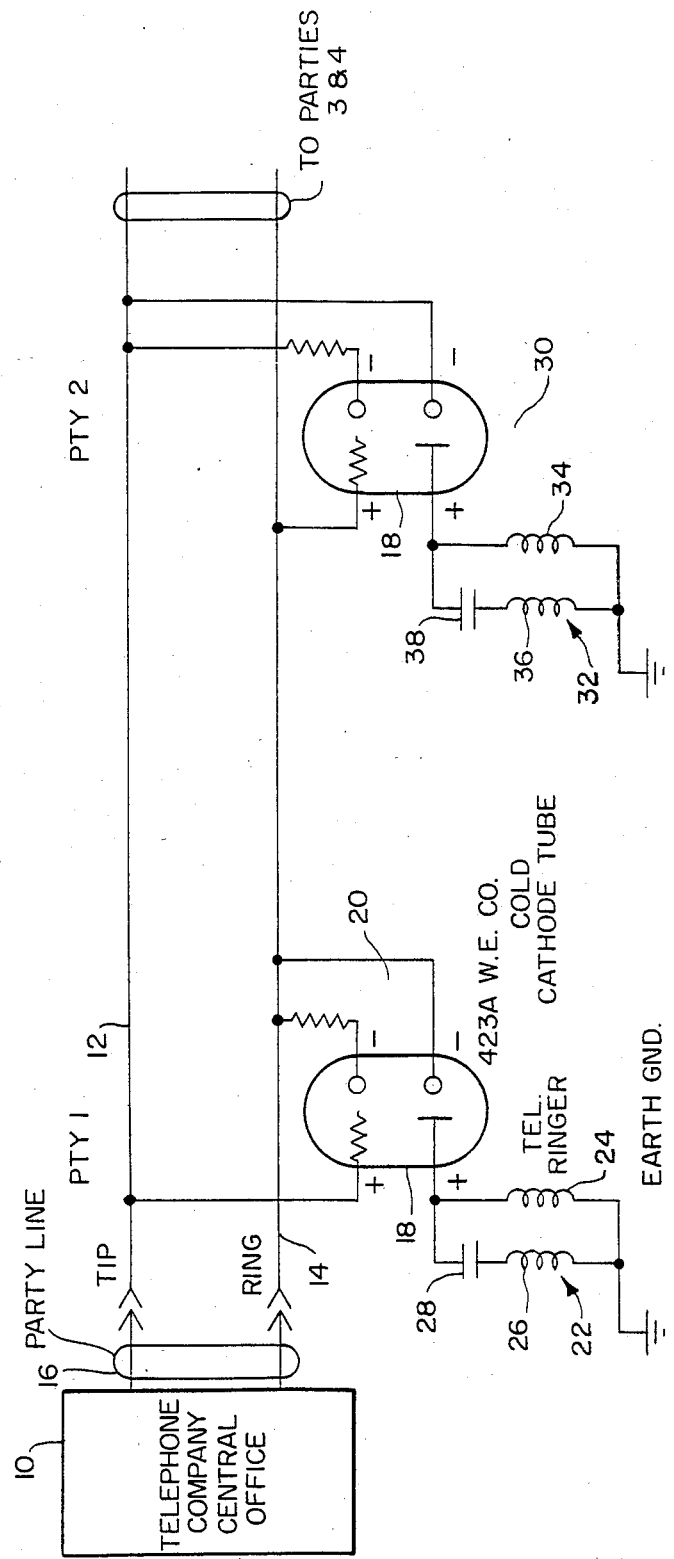
FIG. 1 illustrates a prior art party line system which selectively rings subscribers by the application of a DC potential of a selected polarity to either the tip or ring lines in combination with a time varying signal.
Figure 2:
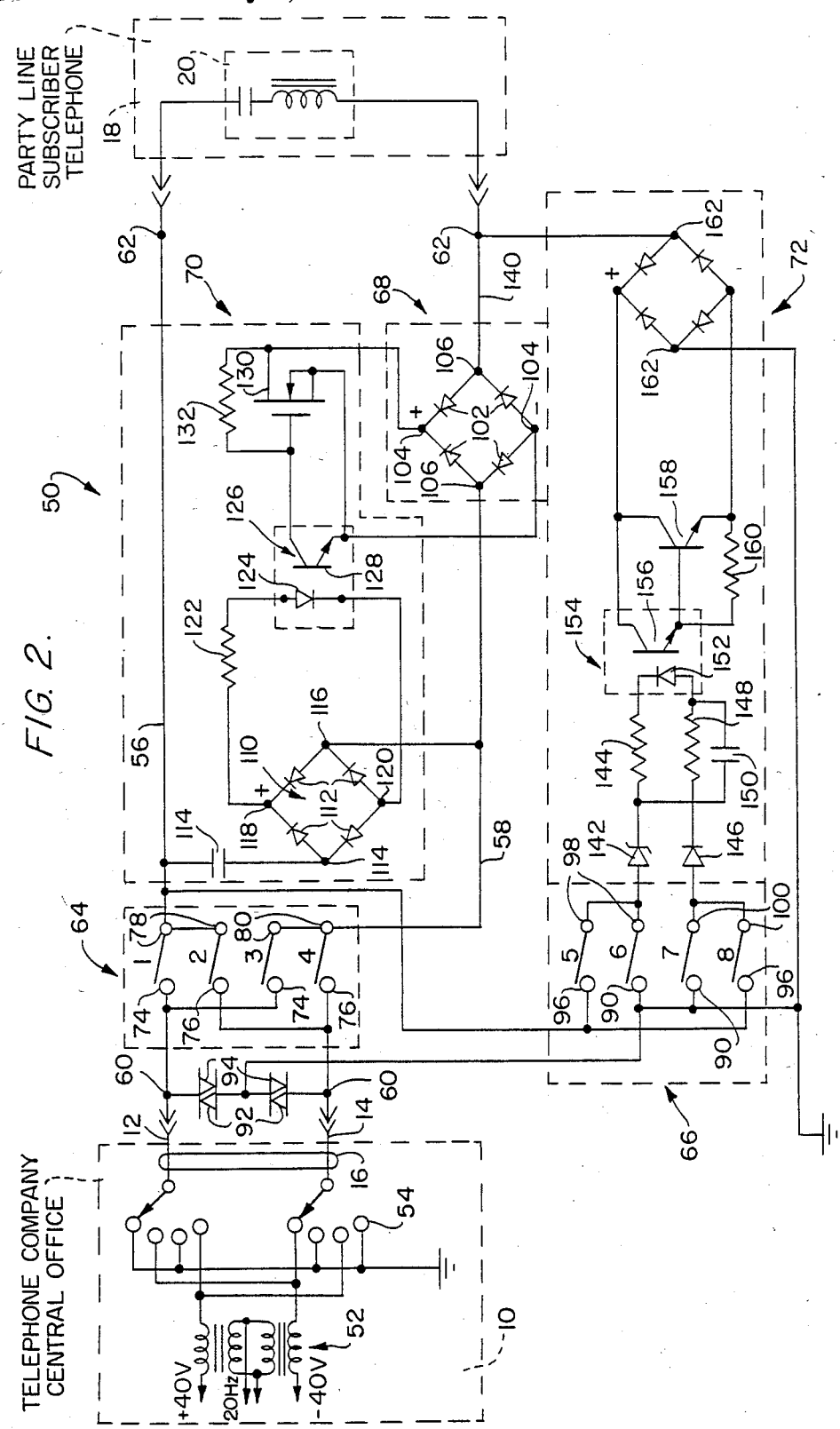
FIG. 2 illustrates a circuit schematic of the present invention.

FIG. 2 illustrates a circuit schematic of a party line interface 50 in accordance with the present invention. The interface 50 is connected to the telephone company central office 10 of the type illustrated in FIG. 1. The telephone company central office 10 provides a party line 16 which contains a tip line 12 and ring line 14 of conventional construction. The interface 50 of the present invention is adapted to be connected to the party line 16 at the tip line 12 and ring line 14 terminals which are located at the individual party line subscriber's location. The telephone company central office 10 has a battery 52 which selectively produces a ringing signal having a DC component of a particular polarity which is applied either to the tip line 12 or ring line 14 with a time varying signal such as a 20 Hz ringing tone. The telephone company office has a multicontact switch 54 which is positioned for a four subscriber party line at any one of four different positions as indicated by the two groups of four contacts. The ringing signal consisting of the DC component of a positive or negative polarity and the 20 Hz AC component is applied selectively to one of the ring line 14 or tip line 12 while a ground reference from the central office is supplied to the other of the ring line or tip line which is not connected to the combination of DC and AC components produced by the telephone company central office battery 52. The construction of the telephone company central office battery 52 and switching mechanism 54 is conventional and does not form part of the present invention. There is no ground wire furnished with telephone 18. Party line telephones designed for use in the prior art system of FIG. 1 are provided with a ground wire.

The party line interface 50 has a signal path for conducting audible frequency signals containing two lines 56 and 58 which each have an input terminal 60 and an output terminal 62. A programmable switching means is coupled to the signal paths 56 and 58 for selectively applying the ringing signal and ground reference received by the party line interface 50 from the telephone company central office 10 to the output terminals 62 for application to the ringing mechanism 20 contained within the standard telphone 18 as a function of the polarity of the DC component and ground reference applied to the input terminals 60. The programmable switching means is programmed such that the ringing signal applied to the input terminal 60 is transmitted to the standard telephone 18 only when one of the two DC polarities (plus 40 volts or minus 40 volts) provided by the telephone company central office 10 is applied to a chosen one of ring line 14 or tip line 12. The programmable switching means may be implemented by a first programmable switching means 64, a second programmable switching means 66, a first switching means 68, means for generating a control signal 70 and a second switching means 72. The details of the first programmable switching means 64, the second programmable switching means 66, the first switching means 68, the means for generating a control signal 70 and the second switching means 72 are described in detail, infra.

The function of the first programmable switching means 64 is to permit the programmable connection of the ring line 14 and tip line 12 selectively to either line 56 or line 58. The first programmable switching means 64 has a first pair of input terminals 74 and a second pair of input terminals 76 and a first pair of output terminals 78 and a second pair of output terminals 80. Four switches 1, 2, 3 and 4 permit the selective connection of an input terminal 74 or 76 with its associated output terminal 78 or 80 upon closure of the switch. The first pair of output terminals 78 is connected to wire 56 and the second pair of output terminals 80 is connected to wire 58.

The function of the second programmable switching means 66 is to cause the connection of the terminals 162 of the second switching means only when the terminals 106 of the first swithing means are open circuited, thereby completing the ground reference to the ringing circuit 20 of telephone 18. The second programmable switching means 66 has a first pair of input terminals 90 which are coupled to the ring line 14 and tip line 12 by means of a parallel combination of Zener diode 92 and a Zener diode 94 and a second pair of input terminals 96 which are coupled to wire 56. The respective Zener diodes only break down when the positive or negative DC potential is present while blocking passage of voltages present during talking. The first pair of input terminals 90 is also adapted to be connected to electrical ground. The second programmable switching means 66 also has a first pair of output terminals 98 and a second pair of output terminals 100 and four individual switches 5, 6, 7, and 8, which permit the selective connection of an input terminal with its associated output terminal upon closure of the switch.

The function of the first switching means 68 is to open circuit the signal path in line 58 during the presence of the ringing signal. The first switching means 68 has four diodes 102 which are polled in a full wave rectifier configuration. A first pair of terminals 104 are coupled to the means for generating a control signal 70 to be described below for selectively open circuiting a second pair of terminals 106. When the first switching means is short circuited to connect the terminals 106 together, current passes directly from output terminal 80 to the party line subscriber telephone 18 which occurs when the telephone receiver is off hook. The means for generating a control signal 70 functions to detect the presence of the AC ringing component present in the ringing signal provided by the telephone company central office 10. When the AC component is present and detected, the means for generating a control signal 70 causes the open circuiting of the terminals 106 of the first switching means to block the passage of audible frequency signals through line 58 to a subscriber. The AC component in the ringing signal flows from the lines 56 and 58 to the full wave rectifier 110 consisting of four polled diodes 112. Capacitor 114 is connected in series between line 56 and terminal 115 for storing bias potential to insure generation of the control signal during the presence of the time varying ringing signal. Terminal 116 is connected to line 58. The positive terminal 118 is connected to the negative terminal 120 of the rectifier bridge 110 by a series connection of resistor 122 and photodiode 124. The photodiode 124 is part of an optical isolator which additionally includes a phototransistor 128. The presence of the AC ringing component causes conduction in the optical isolator 126 to produce current flow which turns off field effect transistor 130. Resistor 132 is provided for proper biasing of the gate electrode by the production of a voltage drop between the gate and the drain electrode of the field effect transistor 132. When the transistor 128 conducts, the field effect transistor 130 is turned off which opens circuits the normally closed circuit connection between terminals 106. Upon the ending of the application of ringing signal to the party line 16 by the telephone company central office 10, the first switching means 68 is closed connecting terminals 106 together to permit current flow between terminals 80 and the party line subscriber telephone 18 to establish a normal talking path of very low impedance which minimizes line drop. The field effect transistor 132 has sufficiently low impedance to minimize the line drop consequent from the first switching means 68. If the telephone 18 at the party line subscriber location 20 goes off hook, the output voltage produced across terminals 118 and 120 of the means for generating the control signal 70 is too small to maintain conduction of the optical isolator 126 which causes the field effect transistor 130 to conduct to connect terminals 106 together of the first switching means 68.

The second switching means 72 functions to apply a ground reference to part 140 of the line 58 upon the open circuiting of the first switching means 68 during the presence of the ringing signal. The application of a ground potential to part 140 insures a low impedance path to ground to complete the ringing circuit between ground and the positive or negative flow of current in line 56 consequent from the opening of the first switching means 68 and the closing of the second switching means 72 to connect part 140 to ground. The first pair of output terminals 98 of the second programmable switching means 66 are connected to a series connection of Zener diode 142 and resistor 144. The second pair of output terminals 100 of the second switching means 66 is connected to a series connection of diode 146 and resistance 148. Capacitor 150 is connected between the cathode of Zener diode 142 and the anode of photodiode 152 which is connected between the resistances 144 and 148. The photodiode 152 is part of optical isolator 154 which additionally includes transistor 156. A transistor amplification stage 158 is connected to the optical transistor 156 to amplify the current output from the transistor 156. Resistor 160 is provided for appropriate biasing of the base of transistor 158. Activation of the transistor 158 causes terminals 162 to be electrically connected together to cause grounding of the part 140 of wire 58 to complete the ringing circuit while the first switching means 68 is open circuited.

The party line interface 50 of the present invention is programmable to permit the activation of ringing mechanism 20 in standard telephone 18 which is connected to a party line 16 in response to any of the four combinations of DC ringing polarity as applied to either the ring line 14 or tip line 12 while grounding the other line. The multicontact first programmable switching means 64 and the multicontact second programmable switching means 66 function to select the proper line and voltage polarity to ring any one of four subscribers connected to the party line by a standard telephone. The first combination of switch closings to ring subscriber telephone 20 is the closing of switches 2, 3, 5 and 7. The second combination of switch closings to ring a selected subscriber is the closing of switches 1, 4, 5 and 7. The third combination of switch closings to ring a subscriber telephone 20 is the closing of switches 2, 3, 6 and 8. The fourth combination of switch closings to ring a subscriber 20 is the closing of switches 1, 4, 6 and 8. Each of the above-referenced combinations of closings of switches will only pass ringing current to the ringing mechanism 20 in the standard telephone 18 for a particular combination of DC ringing polarity applied to a particular one of the ring line 14 or tip line 12 by the telephone company central office 10.

The operation of the party line interface 50 with switches 2, 3, 5 and 7 closed is explained as follows. The central office 10 applies a combination of a minus 40 volt DC potential and a superimposed 20 Hz ringing signal to the ring line 14. The tip line 12 is grounded. The ringing signal is produced by the positioning of switch 54 at the central office as illustrated in FIG. 2. The means for generating a control signal 70 senses the presence of the AC ringing component to cause the open circuiting between terminals 106 of the first switching means 68. The minus 40 volt ringing potential is applied from the first pair of output contacts 78 of the first programmable switching means 64 to the second pair of input contacts 96 of the second programmable switching means 66. The zener diode 142 is reversed biased to its breakdown potential to cause photodiode 152 to conduct to activate phototransistor 156 and transistor 158 to short circuit terminals 162 together to ground part 140 of line 58. Thus ringing current flows from ground through terminals 162, the ringing mechanism 20 of standard telephone 18 through line 56 back to the telephone company central office. When the ringing voltage is removed or the telephone goes off hook at the subscriber location, the first switching means 68 closes to permit conduction between the telephone company central office 10 and the telephone subscriber location and the second switching means 72 open circuits to remove ground from part 140 of line 58. Any other combination of DC ringing potential applied to either the ring line 14 or tip line 12 causes the first switching means 68 to open circuit terminals 106 and the second switching means 72 to open circuit terminals 162 to prevent a ground path to the ringing circuit 20 of the subscriber telephone 18 which precludes activation of the ringing circuit.

The second combination of switch closures 1, 4, 5 and 7 activates the ringing mechanism 20 in the standard telephone 18 when a negative DC potential is applied to the tip line 12 and a ground reference is applied to the ring line 14 by the telephone company central office. This combination of DC polarity and application to a particular one of the ring line 14 and tip line 12 causes the application of a negative DC potential to the tip line 12. The aforementioned combination of switch closings applies the negative DC potential to line 56 while applying a ground reference to line 58. Under these conditions, the first switching means 68 open circuits contacts 106 and the second switching means 72 close circuits contacts 162 to provide a ground reference to the ringing circuit 20 of party line subscriber telephone 18 to complete the path for ringing current from ground back through the telephone company central office. Any other combination of DC potential applied to either of the lines 56 or 58 causes an open circuiting of the contacts 106 of the first switching means 68 and the contacts 162 of the second switching means 72 which prevents ringing from occurring.

The third combination of switch closures 2, 3, 6 and 8 functions to activate the ringing mechanism 20 of the standard telephone 18 when a positive DC polarity is provided by the telephone company central office on ring line 14 and a ground reference is applied to tip line 12. This combination of switch closures causes positive current to flow through line 56 down through the ringing mechanism 20 of standard telephone 18 through the second switching mechanism 72 to ground to complete the ringing circuit while the first switching means 68 has open circuited contacts 106. Any other combination of DC potential applied to either of the lines 56 or 58 causes the open circuiting of the first switching means 68 and the second switching means 72 which prevents the completion of a ringing circuit.

The combination of switch closings 1, 4, 6 and 8 produces ringing of the ringing mechanism 20 of the standard telephone 18 when a positive DC potential is provided by the telephone company central office 10 to the tip line 12 and a ground reference is applied to the ring line 14. Under these conditions, the first switching means 68 open circuits contacts 106 and the second switching means 72 close circuits contacts 162 to provide a ringing circuit path from ground back to the telephone company central office 10. Any other combination of DC potential applied to either of the lines 56 or 58 causes the open circuiting of the first switching means 68 and the second switching means 72 which prevents the completion of a ringing circuit.

While the invention has been described in terms of its preferred embodiment, it should be understood that numerous modifications may be made thereto without departing from the spirit and scope of the invention as defined in the appended claims.

I claim:

1. A party line interface for connecting a standard telephone to a party line having a pair of lines for conducting audible frequency signals between a telephone central office and a party line subscriber whose telephone is selectively rung by the central telephone office by the application of a ringing signal to one side of a ringing circuit in the subscriber's telephone and ground to the other side of the ringing circuit, the ringing signal including a DC component of either a positive or negative polarity referenced with respect to ground and a time varying signal applied to one of said pair of lines in said party line and a ground reference applied to the second of said pair of lines comprising:
   (a) A signal path for conducting audible frequency signals having two lines with each line having an input terminal and an output terminal, said input terminals being respectively adapted to be connected to different lines of said pair of lines of said party line and said output terminals being respectively adapted to be connected to different lines of said standard telephone; and
   (b) programmable switching means coupled to said signal path for selectively applying said ringing signal received by said party line interface from said central telephone office to one of said output terminals for application to a ringing mechanism within said standard telephone as a function of the polarity of said DC component and ground reference applied to said input terminals, said ringing signal being applied to said standard telephone by said interface only when one of said two polarities provided by said party line central office is applied to one of said pair of lines of the party line.

2. A party line interface for connecting a standard telephone to a party line having a pair of lines for conducting audible frequency signals between a telephone central office and a party line subscriber whose telephone is selectively rung by the central telephone office by the application of a ringing signal to one side of a ringing circuit in the subscriber's telephone and ground to the other side of the ringing circuit, the ringing signal including a DC component of either a positive or negative polarity referenced with respect to ground and a time varying signal applied to one of said pair of lines in said party line and a ground reference applied to the second of said pair of lines comprising:
   (a) a signal path for conducting audible frequency signals having two lines with each line having an input terminal and an output terminal, said input terminals being respectively adapted to be connected to different lines of said pair of lines of said party line and said output terminals being respectively adapted to be connected to different lines of said standard telephone; and
   (b) programmable switching means coupled to said signal path for selectively applying said ringing signal received by said party line interface from said central telephone office to one of said output terminals for application to a ringing mechanism within said standard telephone as a function of the polarity of said DC component and ground reference applied to said input terminals, said ringing signal being applied to said standard telephone by said interface only when one of said two polarities provided by said party line central office is applied to one of said pair of lines of the party line, said programmable switching means comprising:

(i) first programmable switching means having a pair of inputs which are respectively adapted to be coupled to separate ones of said pair of lines of said party lines and a pair of outputs coupled respectively to separate ones of said lines of said signal path for permitting selective connection of each line of said pair of lines of said party line to a desired one of said lines of the party line;

(ii) second programmable switching means having a first input which is respectively adapted to be coupled to said pair of lines of said party line and a second input adapted to be coupled to ground and to one of the pair of inputs of the first programmable switching means during the ringing of the subscriber's telephone and a pair of outputs;

(iii) first switching means coupled to one of said lines of the signal path which is selectively openable upon application of a control signal to prevent current flow between said central telephone office and said subscriber telephone on said line of said signal path to which said first switching means is coupled, said one of said lines of the signal path having a part which is coupled to said standard telephone when said first switching means is open when said lines of the signal path are connected to said standard telephone;

(iv) means for generating a control signal when said time varying signal is present, said means for generating being coupled to the outputs of said first programmable switching means; and (v) second switching means having a terminal adapted to be coupled to ground for establishing a connection between said terninal of said second switching means and said part of said one of said lines of said signal path when said second switching means is closed, said second switching means having a pair of inputs coupled to the outputs of said second programmable switching means, and being closed only upon the presence of predetermined signal polarities at said inputs of the second programmable switching means.

3. A party line interface in accordance with claim 2 wherein (a) said first programmable switching means has first and second pairs of input terminals, first and second pairs of output terminals and four switches, each having a separate associated input and output terminal, each switch being respectively connected between a separate associated input and output terminal for selectively connecting each associated input terminal to its associated output terminal, one of said pair of input terminals of said first programmable switching means being coupled to one of said input terminals of said lines of said signal path and the other of said pair of input terminals of said first programmable switching means being coupled to the other of said input terminals of said lines of said signal path, one of said pair of output terminals of said first programmable switching means being coupled to one of said lines of the signal path and the other of said pair of output terminals of said first programmable switching means being coupled to the other of said lines of said signal path;

(b) said second programmable switching means has first and second pairs of input terminals, first and second pairs of output terminals and four switches each having a separate associated input and output terminal, each switch being respectively connected between a separate associated input and output terminal for selectively connecting each associated input terminal to its associated output terminal, one of said pair of input terminals of said second programmable switching means being coupled to said pair of input terminals of said signal path and being adapted to be connected to ground, the other of said pair of input terminals of said second programmable switching means being coupled to one of said pair of output terminals of said first programmable switching means, the pair of output terminals of said second programmable switching means being coupled to said second switching means.

4. A party line interface in accordance with claim 2 wherein said first switching means is coupled in series with said one of said lines of the signal path.

5. A party line interface for connecting a standard telephone to a party line having a pair of lines for conducting audible frequency signals between a telephone central office and a party line subscriber whose telephone is selectively rung by the central telephone office by the application of a ringing signal to one side of a ringing circuit in the subscriber's telephone and ground to the other side of the ringing circuit, the ringing signal including a DC component of either a positive or negative polarity referenced with respect to ground and a time varying signal applied to one of said pair of lines in said party line and a ground reference applied to the second of said pair of lines comprising:

(a) a signal path for conducting audible frequency signals having two lines with each line having an input terminal and an output terminal, said input terminals being respectively adapted to be connected to different lines of said pair of lines of said party line and said output terminals being respectively adapted to be connected to different lines of said standard telephone; and (b) programmable switching means coupled to said signal path for selectively applying said ringing signal received by said party line interface from said central telephone office to one of said output terminals for application to a ringing mechanism within said standard telephone as a function of the polarity of said DC component and ground reference applied to said input terminals, said ringing signal being applied to said standard telephone by said interface only when one of said two polarities provided by said party line central office is applied to one of said pair of lines of the party line, said programmable switching means comprising:

(i) first programmable switching means having a pair of inputs which are respectively adapted to be coupled to separate ones of said pair of lines of said party lines and a pair of outputs coupled respectively to separate one of said lines of said signal path for permitting selective connection of each line of said pair of lines of said party line to a desired one of said lines of the signal path;

(ii) second programmable switching means having a first input which is respectively adapted to be coupled to said pair of lines of said party line and a second input adapted to be coupled to ground and to one of the pair of inputs of the first programmable switching means during the ringing of the subscriber's telephone and a pair of outputs; and (iii) first switching means having a terminal adapted to be coupled to ground for establishing a connection between said terminal of said switching means and a part of one of said lines of said signal path when said switching means is closed, said switching means having a pair of inputs coupled to the outputs of said second programmable switching means, said switching means being activated only upon the presence of predetermined signal polarities at said inputs of the switching means.

* * * * *